United States Patent [19]

Cook

[11] Patent Number: 4,668,021
[45] Date of Patent: May 26, 1987

[54] BRAKE FEEL AUGMENTATION VALVE AND SYSTEM

[75] Inventor: Robert D. Cook, Valencia, Calif.

[73] Assignee: Crane Co., New York, N.Y.

[21] Appl. No.: 723,044

[22] Filed: Apr. 15, 1985

[51] Int. Cl.⁴ .............................................. B60T 8/02
[52] U.S. Cl. ...................................... 303/93; 303/54; 303/117
[58] Field of Search ....................... 303/54, 55, 40, 92, 303/93, 113, 116, 117

[56] References Cited

U.S. PATENT DOCUMENTS

| 3,433,594 | 5/1969 | Frayer. | |
|---|---|---|---|
| 3,486,801 | 12/1969 | Frayer. | |
| 3,635,531 | 1/1972 | Okamoto et al.. | |
| 3,671,082 | 6/1972 | Stevens. | |
| 3,704,047 | 11/1972 | Yarber | 303/54 |
| 3,923,423 | 12/1975 | Lauck. | |
| 4,053,187 | 10/1977 | Cook | 303/93 |
| 4,113,323 | 9/1978 | Haney | 303/115 |
| 4,125,290 | 11/1978 | Reinecke et al. | 303/40 X |
| 4,130,322 | 12/1978 | Cook | 303/93 |
| 4,260,198 | 4/1981 | Cook | 303/92 |
| 4,334,713 | 6/1982 | Dauvergne | 303/54 |

FOREIGN PATENT DOCUMENTS

| 1555615 | 11/1966 | Fed. Rep. of Germany. |
| 2014828 | 4/1970 | France. |
| 1385638 | 9/1973 | United Kingdom. |

Primary Examiner—Duane A. Reger
Attorney, Agent, or Firm—Willian Brinks Olds Hofer Gilson & Lione Ltd.

[57] ABSTRACT

Single and dual brake feel augmentation valves for use in a vehicle skid control system are disclosed. The brake feel augmentation valve has a first port which receives hydraulic fluid from a constant source, a second port which receives hydraulic fluid from a pilot operated pressure metering valve, a third port which supplies hydraulic fluid to the brakes, and a hydraulic return port. A pressure balancing spool valve, with a brake pressure feedback channel, controls the supply of hydraulic fluid to the brake pressure port from the constant source port as a function of the metered pressure and fedback brake pressure. When the metered pressure is greater than the fedback brake pressure, the spool valve allows hydraulic fluid from the constant source to flow into the brake pressure port, thereby filling the brakes. The spool valve blocks the flow of hydraulic fluid to the brake pressure port from the constant supply port when the fedback brake pressure acting on the spool valve is equal to or greater than the metered pressure. Since the brakes are filled by a constant source of hydraulic fluid, rather than by the pilot's metering valve, the pressure drop which occurs while the brakes fill is isolated from the pilot's pressure metering valve and brake pedal. The brake pedal, therefore, has a more responsive feel during the brake filling process.

12 Claims, 7 Drawing Figures

4,668,021

BRAKE FEEL AUGMENTATION VALVE AND SYSTEM

BACKGROUND OF THE INVENTION

This invention relates to a vehicle brake control system and, in particular, to a brake feel augmentation valve to be used in an aircraft skid control system.

Prior state-of-the art vehicle skid control systems are described in the inventor's prior U.S. Pat. Nos. 4,053,187, 4,130,322 and 4,260,198. In these systems the vehicle operator (e.g., an airplane pilot) initiates braking action by depressing a brake pedal. The brake pedal is connected to a pressure metering valve which supplies hydraulic fluid to the brakes via a skid control valve. A skid control circuit monitors the output of a wheelspeed transducer to check for skid conditions. If a skid is detected, the skid control circuit sends a control signal to the skid control valve. The skid control valve will regulate the amount of hydraulic fluid the metering valve supplies to the brakes, and thereby control braking action to prevent skidding.

While the brake control system disclosed in the foregoing patents has worked well in aircraft equipped with steel brakes, it has been found that the system could be improved when applied to new aircraft equipped with carbon brakes. Specifically, in the prior patented systems the brake cylinder is filled with hydraulic fluid directly by the pressure metering valve. When the pilot pushes down the brake pedal to initiate braking, the pedal will depress far because the brake cylinders are empty, and the pedal will feel "soft" during the time it takes the brakes to fill. A pressure drop will be created across the pressure metering valve while the brake cylinders fill. However, the brake cylinders fill with hydraulic fluid quickly, which sends an acute hydraulic force to the brake pedal via the pressure metering valve. In carbon brakes, the torque gain at low brake pressures is typically two to four times that of steel brakes. Thus, the acute hydraulic force regularly can be large enough to kick back at the pilot's foot through the pedal, which makes the brakes difficult to control.

SUMMARY OF THE INVENTION

The present invention is directed to an improved brake control system wherein the filling of the brakes is isolated from the pressure metering valve so that immediate pressure is available to the pressure metering valve for responsive brake feel.

According to this invention, a vehicle brake control system is provided with a brake feel augmentation valve. This valve controls the supply of hydraulic fluid to a brake pressure port by a constant source of hydraulic fluid in response to metered pressure from a pressure metering valve and fedback brake pressure.

In a preferred embodiment of the present invention the brake feel augmentation valve comprises a pressure balancing spool valve with four ports. A first port receives hydraulic fluid from the constant source, and is opened and closed by a first land of the spool valve. A second port receives the metered pressure hydraulic fluid and directs it to a second land of the spool. A third port is positioned between the first and second lands, and supplies hydraulic fluid to the brakes. A fourth port is a hydraulic return port. The spool valve is also provided with a feedback channel which directs brake pressure fluid to the first land of of the spool. When the metered pressure is greater than the fedback brake pressure, the spool valve opens the first port to allow hydraulic fluid to be supplied to the brake pressure port from the constant source. When the metered pressure is equal to or less than the fedback brake pressure, the spool valve blocks the supply of hydraulic fluid to the brake pressure port from the constant source port. The return port receives fluid from the brake pressure port when the fedback brake pressure exceeds the metered pressure.

Thus, in the present invention the brake is filled by a constant source of hydraulic fluid, rather than the pressure metering valve. The filling of the brakes, and associated pressure drop, is isolated from the pressure metering valve and the pilot's brake pedal. The brake feel augmentation valve of the present invention is designed so that very little flow is required from the pressure metering valve to initiate brake filling. Therefore, immediate and continuous pressure feedback is available to the pressure metering valve for responsive pedal feel.

The present invention improves braking characteristics, especially at low speeds, by overcoming the problem of acute forces on the brake pedal. The present invention is particularily useful in carbon brake systems, and also can be used to improve the performance of steel brake systems.

The invention itself, together with further objects and attendant advantages, will best be understood by reference to the following detailed description taken in conjuction with the drawings.

DETAILED DESCRIPTION OF A PREFERRED EMBODIMENT

Figure 1:
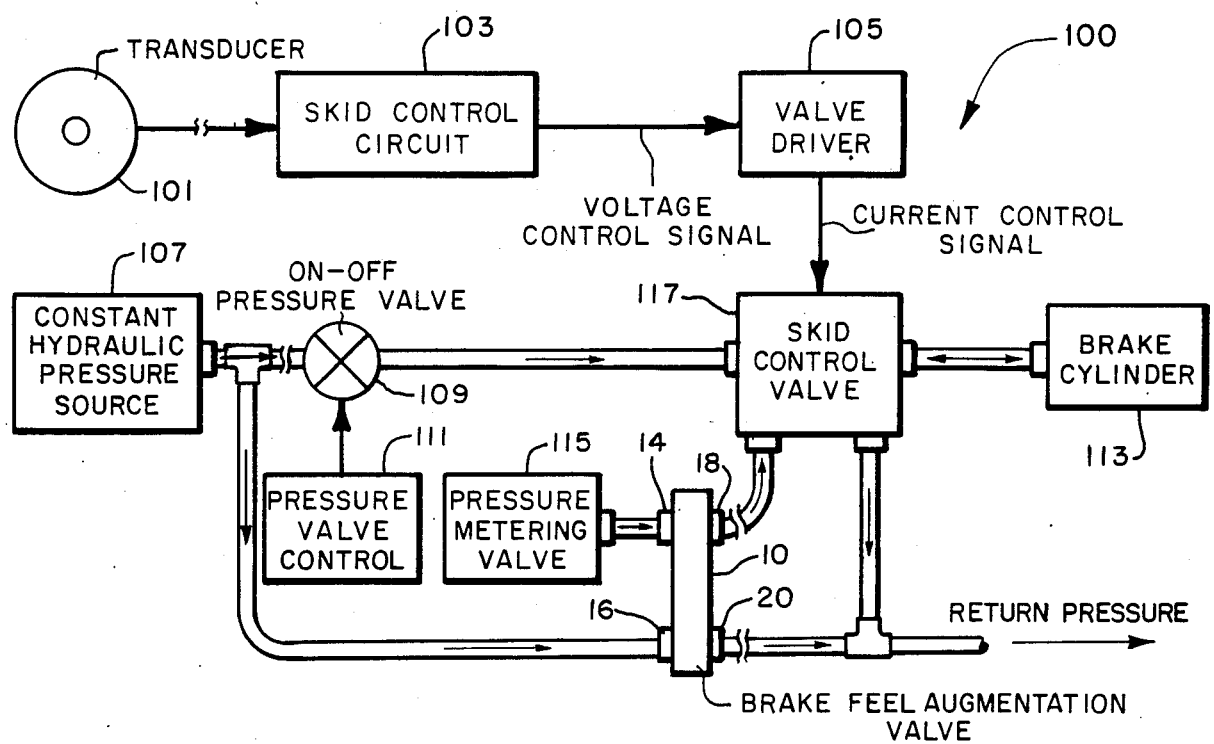
FIG. 1 is a block diagram of a skid control system embodying the present invention.

Referring now to the drawings, FIG. 1 shows the major components of a brake control system 100 embodying the present invention. In the preferred embodiment of the present invention the brake control system is an aircraft skid control system. All the components shown in FIG. 1, except for the single wheel brake feel augmentation valve 10, are standard components of aircraft antiskid systems which are well known in the art. A description of these components and their operation in a brake control system (not having a brake feel augmentation valve) can be found in U.S. Pat. Nos. 3,768,873, 4,053,187, 4,130,322 and 4,260,198. The parts of these patents which describe these components and brake control system are incorporated by reference herein and made a part hereof.

The single wheel brake feel augmentation valve 10 has four external ports which connect to various components of the skid control system. A first port 14 receives hydraulic fluid output from the pilot's pressure metering valve 115. A second port 16 receives hydraulic fluid from a constant hydraulic pressure source 107. The constant source 117 provides hydraulic fluid at a substantially constant system pressure of about 3000 P.S.I. It is possible for the actual system pressure to vary some without affecting the performance of the brake feel augmentation valve 10. In the present embodiment, BMS 3-11 or Skydrol 500 hydraulic fluid is used. A third port 18 supplies hydraulic fluid from the brake feel augmentation valve 10 to the brake cylinder 113 via the skid control valve 117. A fourth port 20 is connected to the system hydraulic return.

Figure 3:
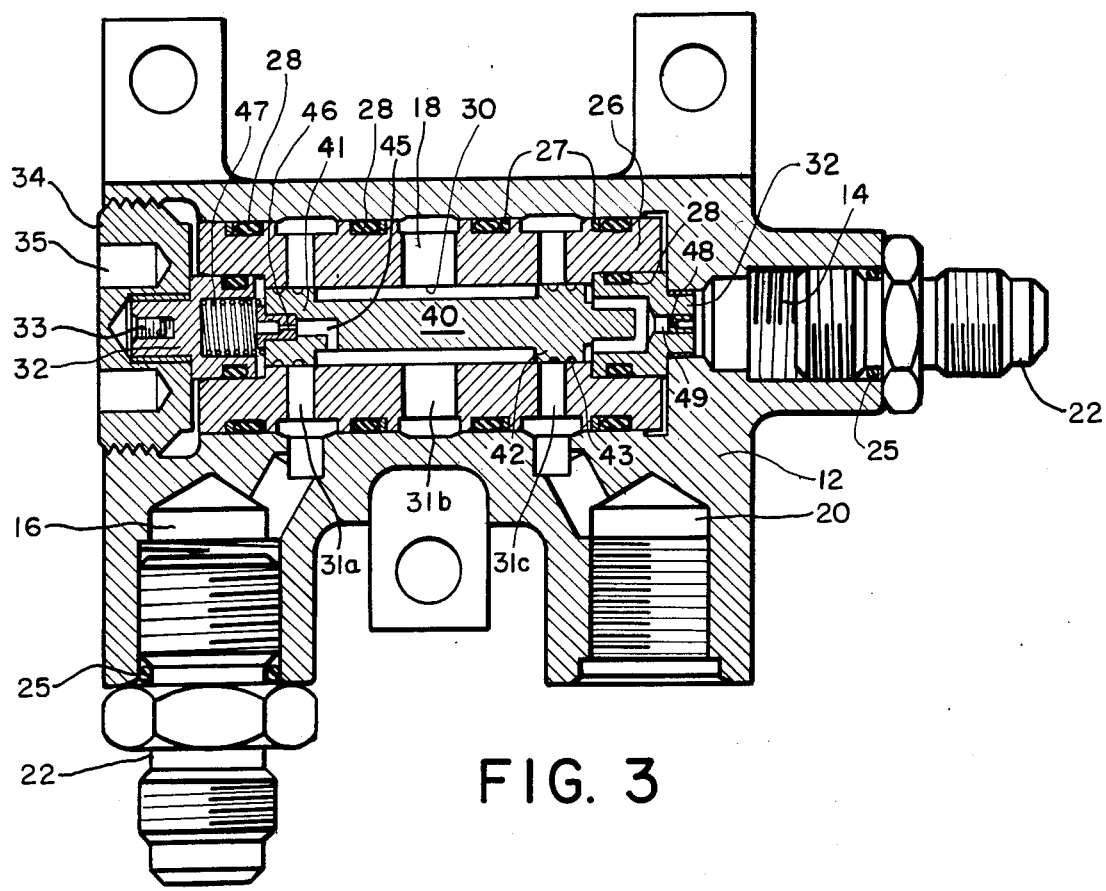
FIG. 3 is cross-sectional view taken along lines 3—3 of FIG. 2.

The structure and construction of a preferred embodiment of a single wheel brake feel augmentation valve 10 of the present invention is shown in FIG. 3. The four ports described above are bore into the valve housing 12. Filter fittings 22 are threaded into the inlets to the constant supply port 16 and the metered pressure port 14. A filter 24 (see FIG. 4) is located inside of each fitting 22 to prevent contaminants from entering the brake feel augmentation valve 10. These filter fittings are standard parts made by Mectron Industries, Inc. An o-ring 25 surrounds each filter fitting in the port inlet to provide a seal.

A portion of the valve housing 12 is bore out to accept the cylindrical sleeve 26. A plurality of Teflon retainers 27 and o-rings 28 are fitted around the circumference of the sleeve 26 to seal off the various ports of the valve. An axial bore 30 extends through the length of the sleeve 26. The sleeve is positioned within the valve housing 12 so that its radial bores 31a-c communicate with the constant source port 16, the brake fill port 18 and the return port 20, respectively.

Both ends of the axial bore 30 are closed with end caps 32. The right end cap shown in FIG. 3 abuts the valve housing 12. The left end cap abuts a cover 34, and is provided with a threaded opening 33 to facilitate insertion of the end plug. The cover 34 threads into the valve housing 12 and holds the left end cap and sleeve 26 in place. A sealant (made by Dow Corning) is placed around the cover 34. A plurality of wrench holes 35 are provided in the cover 34 for turning the cover.

A pressure balancing spool valve 40 fits within the axial bore 30 and slides laterally therein between the left and right end caps 32. The spool has a first land 41 and a second land 42. Both lands are provided with circumferential grooves 43 which equalize pressure around the spool and trap contamination. A feedback channel 45 extends between opposite sides of the first land 41.

A first reduced orifice 46 is pressed into the feedback channel 45 at the first land 41. The reduced orifice 46 is intended to provide damping. A second reduced orifice 48 is pressed into an axial bore 49 which extends through the right end cap 32.

The spool 40 is configured so that when no metered pressure is applied to the system, the first land 41 blocks the constant source port 16 via first radial bore 31a, and the second land blocks the return port 20 via third radial bore 31c. The control surface of the second land 42 is in constant communication with the metered pressure port 14 via the axial bore 49 and second reduced orifice 48 in the right end cap 32. The feedback channel 45 is in continuous communication with the control surface of the first land 41 and the brake pressure port 18.

A spring 47 biases the spool 40 to the position where the first land 41 completely blocks the constant source port 16 and the second land 42 completely blocks the return port 20. The spring 47 is positioned within the left end cap 32 so that it acts against the control surface of the first land 41 of the spool. One end of the spring fits around the circumference of the first reduced orifice 46. The spring 47 is a safety feature which prevents the brakes from filling when there is no metered pressure applied by the pilot. The feature is optional, and may be deleted for some applications.

Figure 4:
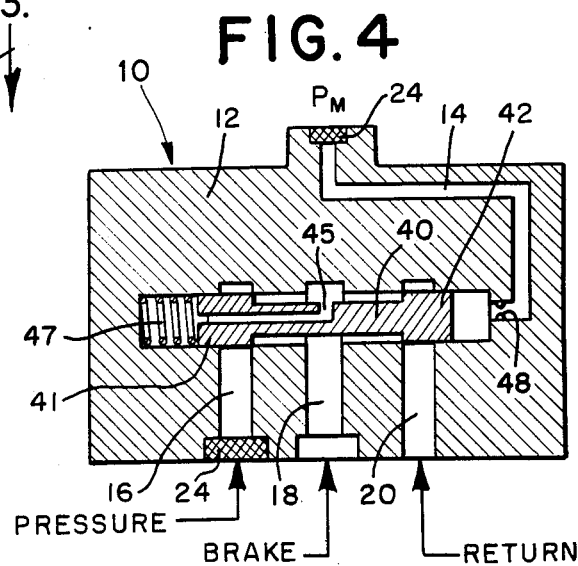
FIG. 4 is a schematic view of the brake feel augmentation valve shown in FIG. 3.

The operation of the brake feel augmentation valve 10 will now be described with reference to FIGS. 1 and 4. Before braking action is initiated by the pilot the spring 47 will bias the spool 40 so that the first land 41 will completely block off the constant source port 16. The pilot initiates braking action by depressing a foot pedal. The pressure metering valve 115, which is connected to the brake pedal, will then produce a hydraulic pressure which is metered by the pilot. This variable metered pressure is transmitted to the metered pressure port 14 of the brake feel valve 10. The metered pressure will push the spool 40 to the left, against the force of the spring 47, to open the constant source port 16. The constant source port 16 will then be allowed to supply hydraulic fluid to the brake pressure port 18 (or brake fill port 18) for filling the brakes.

The feedback channel 45 allows hydraulic fluid supplied to the brake pressure port to be fed back to the control surface of the first land 41 of the spool 40. The spool 40 is a pressure balancing valve, so it will continuously move in the direction of least pressure until the pressures acting on the control surfaces of the lands 41 and 42 are balanced. Thus, when the metered pressure is greater than the brake pressure acting on the spool, the spool will slide to open the constant source port 16, and the constant source will supply hydraulic fluid to fill the brakes. As the brake cylinders fill with hydraulic fluid, the fedback brake pressure on the control surface of the first land will increase. The spool then moves to close the constant source port, thereby restricting the flow of hydraulic fluid from the constant source port 16 to the brake 5, pressure port 18. Thus, the spool 40 provides inherent damping as the brakes fill.

When the fedback brake pressure acting on the first land 41 is equal to the metering pressure, the spool 40 will move to its starting position where it completely blocks the constant pressure port 16 and the return port 20. The brake cylinders will be full of hydraulic fluid at this point, and the supply of fluid from the constant source 107 to the brakes will be cut off.

If the brakes fill sharply so that the fedback pressure acting on the first land 41 exceeds the metered pressure, the second land 42 will uncover the return port. The excess fluid in the brake pressure port will then dump into the return port 20 until the pressures acting on the control surfaces of the spool balance.

It can be seen from the foregoing description that the brake feel augmentation valve 10 controls the filling of the brakes by the constant hydraulic fluid source 107. The brake feel valve acts as a pressure follower with ample flow capacity to fill the brakes as commanded. The brake filling action, however, is isolated from the pilot's metering valve 115 and foot pedal. Since only a small flow is required from the metering valve to control the brake feel augmentation valve 10 during brake filling, and since no pressure drop is seen by the pilot's metering valve, immediate, continuous pressure is fed back to the metering valve. The pilot's foot pedal, therefore, has a responsive feel throughout the brake filling process.

Figure 2:
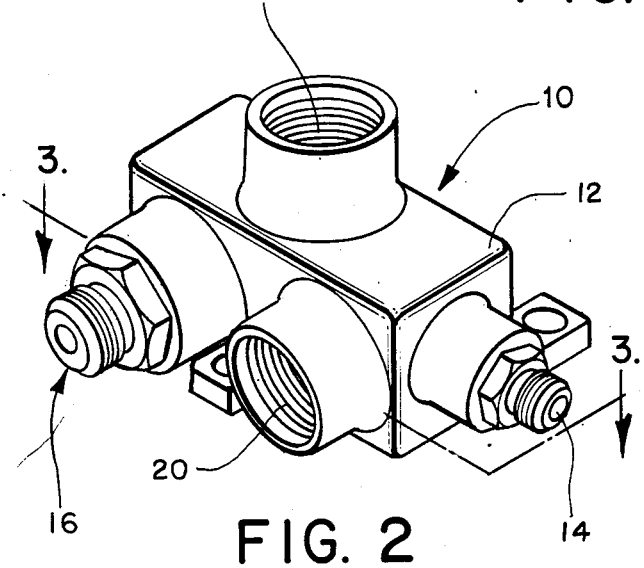
FIG. 2 is a perspective view of a single wheel brake feel augmentation valve of the present invention.
Figure 5:
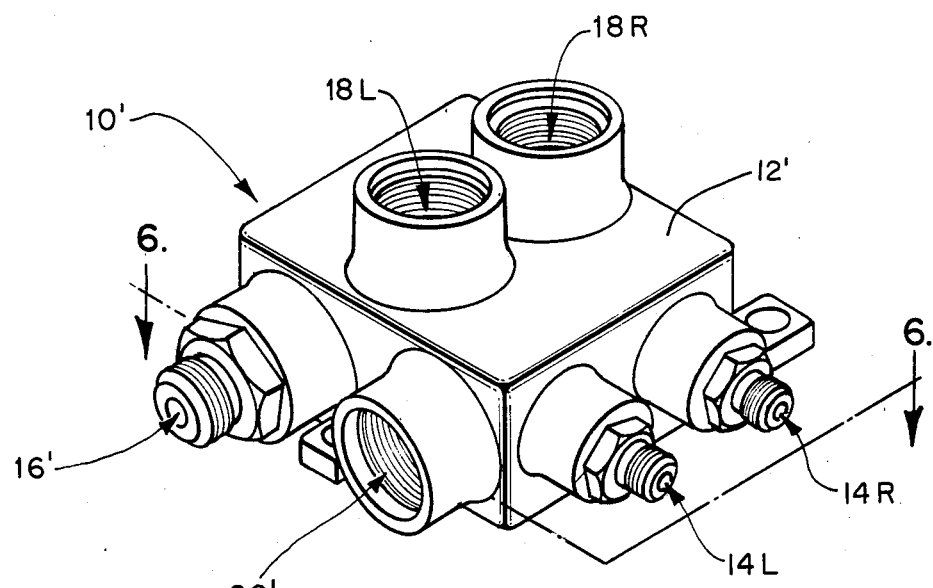
FIG. 5 is a perspective view of a dual wheel brake feel augmentation valve of the present invention.
Figure 6:
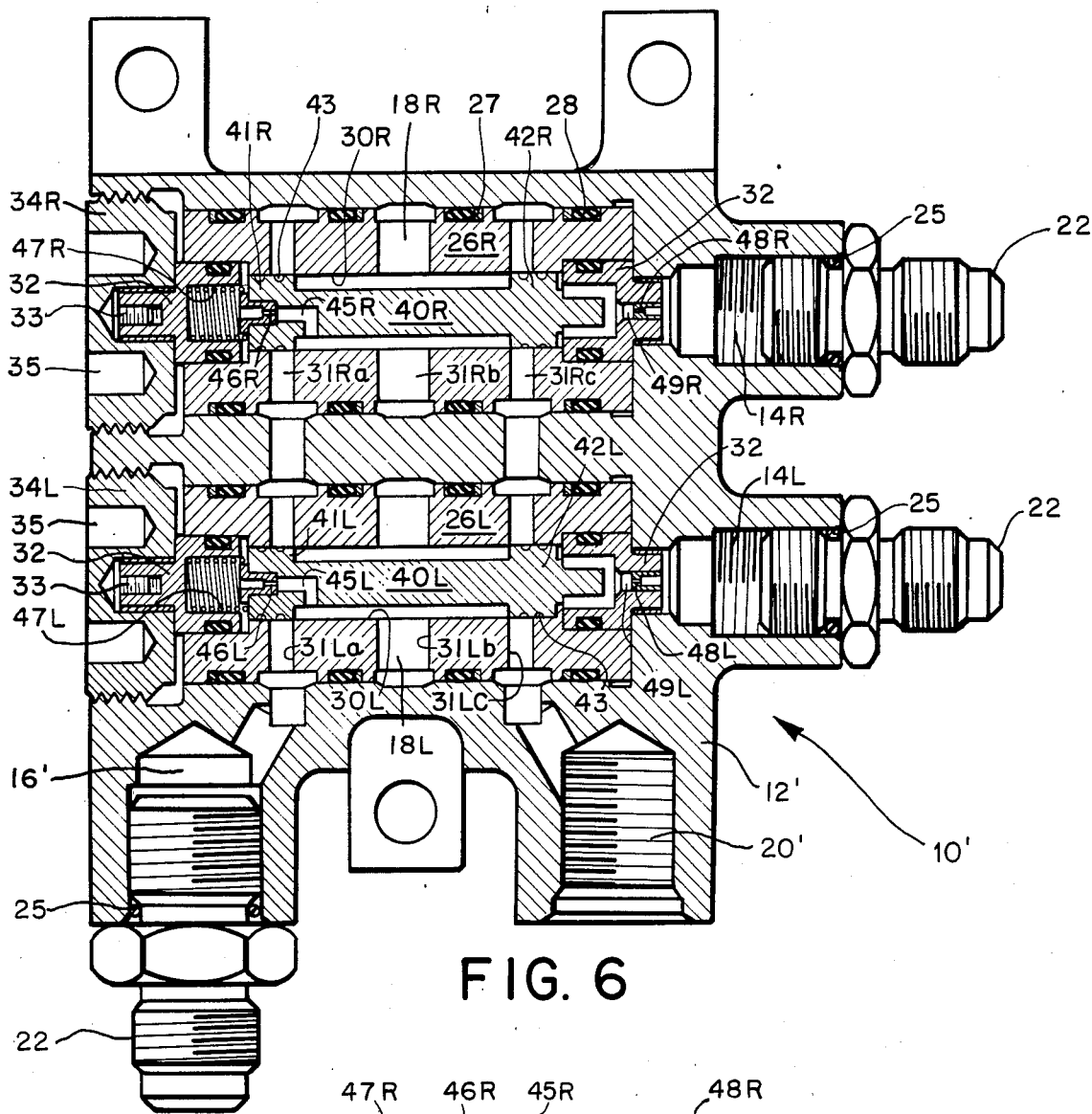
FIG. 6 is a cross-sectional view taken along lines 6—6 of FIG. 5.
Figure 7:
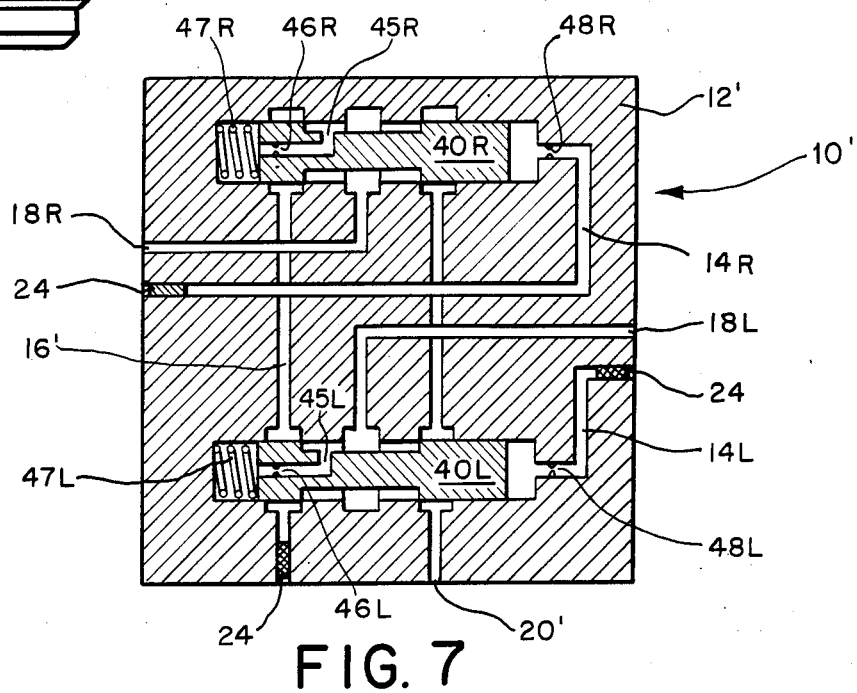
FIG. 7 is a schematic view of the brake feel augmentation valve shown in FIG. 6.

FIGS. 5-7 illustrate a brake feel augmentation valve 10' for use with a paired set of left and right wheels. The structure of the dual wheel brake feel augmentation valve 10' is very similar to the single wheel brake feel augmentation valve 10 shown in FIGS. 2-4. Accordingly, the same reference numerals used in FIGS. 2-4 will be used in FIGS. 5-7 to identify identical parts, with the addition of "L" and "R" to distinguish the components associated with the left and right wheels. The same reference numerals with the addition of primes will be used to designate components which have been slightly modified.

It will be apparent to those skilled in the art that the dual wheel brake feel augmentation valve 10' is basically two single wheel brake feel augmentation valves 10 contained in a single valve housing 12'. The valve housing 12' is configured so that one constant pressure source 16' and one hydraulic return port 20' service both the left and right valve assemblies. All the other components of the dual wheel brake feel augmentation valve 10' are identical to their counterparts in the single wheel brake feel augmentation valve 10 and, therefore, will not be individually described.

The operation of the dual wheel brake feel augmentation valve 10' is very similar to that of the single wheel brake feel augmentation valve 10. The pilot will have left and right brake pedals in the cockpit. Each pedal will be connected to a separate pressure metering valve, which will be connected to its respective left pressure metering port 14L or right pressure metering port 14R.

The dual wheel brake feel augmentation valve 10' allows both the left and right brake to be independently filled and operated in parallel, either separately or simultaneously, in the manner described above for the single wheel brake feel augmentation valve 10.

Thus, the operation of the dual wheel brake feel augmentation valve 10' can be summarily described as follows, it being understood that the detailed description above is equally applicable here for both the right and left braking channels. Before any braking is initiated the left and right springs 47L and 47R will bias their respective spools 40L and 40R to block off the flow of hydraulic fluid from the constant source port 16' to the brake pressure ports 18L and 18R. When either the left or right brake pedals or both are depressed, metered pressure will move its respective spool valve to open the constant pressure supply port 16'. Hydraulic fluid will then be supplied to the respective brake pressure port from the constant source port, and the respective brake will fill. When the brake is filled, the fedback brake pressure acting on the respective first land 41L or 41R will equal the respective metered pressure. The spool then closes off the constant supply port 16'. If the fedback brake pressure acting on a spool exceeds the metered pressure on that spool, the spool will move to open the return port 20', so that the excess hydraulic fluid in the associated brake port will bleed off.

Referring now to FIG. 1 again, the operation of the skid control system 100 that includes the brake feel augmentation valve 10 will now be summarily described. For a further description of the operation of the components shown in FIG. 1 (other than the brake feel augmentation valve) reference should be made to the above identified patents, which are incorporated by reference herein and made a part hereof.

The wheel speed transducer 101 senses wheel speed and generates a signal representative of wheel speed for application to the skid control circuit 103. The skid control circuit 103 performs various operations on the wheel speed signal and generates a voltage control signal, the level of which will generally represent a threshold skid pressure. A valve driver 105 accepts the voltage control signal from the skid control circuit 103 and generates a current control signal which is a function of the input voltage control signal, and is therefore representative of the threshold skid pressure. The current type valve driver 105 is utilized because the current skid control valve 117 is a current controlled servovalve. The skid control valve 117 is adapted to accept substantially constant hydraulic pressure from source 107. Interposed between the skid control valve 117 and the constant source 107 is an on-off pressure valve 109 for selectively allowing or preventing the application of hydraulic pressure valve control 111. The operation and function of the on-off pressure valve 109 is described in U.S. Pat. No. 4,130,322.

The skid control valve 117 provides for the application of brake pressure from the brake feel augmentation valve 10 to the brake cylinder 113. The brake pressure is controlled by the skid control valve 117 to follow either the pressure from the brake feel augmentation valve 10 or the control pressure generated by the skid control valve 117 in response to the current control signal. Further description of the skid control valve 117 can be found in U.S. Pat. Nos. 4,130,322 and 4,260,198.

It should be understood that various changes and modifications to the preferred embodiment described above will be apparent to those skilled in the art. It is intended that the foregoing description be regarded as illustrative rather than limiting, and that it be understood that it is the following claims, including all equivalents, which are intended to define the scope of the invention.

I claim:

1. In a vehicle skid control system, the combination comprising:
    means for providing a constant source of hydraulic fluid;
    means for providing hydraulic fluid at variable metered pressure;
    brake feel augmentation valve means having a brake fill port and controlling the supply of hydraulic fluid to the brake fill port by the constant source means in response only to the metered pressure and pressure from the brake fill port; and
    a separate skid control valve means having a first port connected to the brake fill port of the brake feel valve, a second port for providing a control pressure to a brake cylinder, and means for adjusting the control pressure in response to signals received from a skid control circuit.

2. The invention of claim 1 wherein the brake feel valve means is a pressure balancing valve means for controlling the supply of hydraulic fluid to the brake fill port by the constant source means as a function of the metered pressure and the brake fill port pressure only, the pressure balancing valve means allowing the constant source means to supply fluid to the brake fill port when the metered pressure is greater than the brake fill port pressure and blocking the supply of fluid to the brake fill port when the metered pressure is equal to or less than the brake fill port pressure.

3. The invention of claim 2 wherein the pressure balancing brake feel valve means is a spool valve.

4. The invention of claim 2 further comprising means for biasing the pressure balancing brake feel valve means to prevent the supply of hydraulic fluid to the brake fill port by the constant source means.

5. In a vehicle skid control system, the combination comprising:
   means for providing a constant source of hydraulic fluid at a first pressure;
   a pressure metering valve for providing hydraulic fluid at a pressure which is metered by the vehicle operator;
   a pressure balancing brake feel augmentation valve having a constant source port for receiving the first pressure fluid, a metered supply port for receiving the metered pressure fluid, and a brake fill port, the valve operative to allow the constant source port to supply hydraulic fluid to the brake fill port when the metered pressure is greater than brake fill port pressure, and to block the supply of hydraulic fluid to the brake fill port from the constant source port when the metered pressure is equal to or less than brake fill port pressure; and
   a separate skid control valve means having a first port connected to the brake fill port of the brake feel valve, a second port for providing a control pressure to a brake cylinder, and means for adjusting the control pressure in response to skid control signals received from a skid control circuit.

6. The invention of claim 5 wherein the pressure balancing brake feel valve means is a spool valve having a first control surface acted upon by the metered pressure and a second control surface acted upon by the brake fill port pressure.

7. The invention of claim 6 further comprising spring means for biasing the spool valve to a position where it blocks the supply of hydraulic fluid to the brake fill port from the constant source port.

8. The invention of claim 7 further comprising a hydraulic return port for receiving fluid from the brake fill port where brake port pressure exceeds the metered pressure.

9. For use in a vehicle skid control system having a constant source of hydraulic fluid at first pressure, a source of hydraulic fluid at a pressure which is metered by the vehicle operator, and a skid control valve having an input port, and an output port for providing a control pressure to a brake cylinder, and a skid control circuit for providing skid control signals for adjusting the brake control pressure, a separate brake feel augmentation valve comprising:

a valve housing having a constant supply port for receiving hydraulic fluid from the constant source, a metered supply port for receiving the variable metered pressure hydraulic fluid, a brake fill port for providing hydraulic fluid to the skid control valve input port, and a cylindrical bore which is connected to the constant source port, the metered supply port and the brake fill port;
   a pressure balancing spool valve having first and second lands each having an outer control surface, and a feedback channel extending between opposite sides of the first land; and
   the spool valve being laterally movable within the cylindrical bore so that the constant supply port is opened and closed by the first land, the metered supply port supplies metered pressure hydraulic fluid to act against the outer control surface of the second land, the brake fill port is positioned between the first and second lands, and the feedback channel is in communication with the brake fill port and the outer control surface of the first land, whereby the spool valve slides to open the constant supply port when the metered pressure acting on the outer control surface of the second land is greater than the fedback brake fill pressure acting on the outer control surface of the first land, thereby allowing hydraulic fluid to be supplied to the brake fill port from the constant supply port, and the spool valve slides to close the constant supply port when the metered pressure acting on the outer control surface of the second land is equal to or less than the fedback brake fill pressure acting on the outer control surface of the first land, thereby blocking the supply of hydraulic fluid to the brake fill port from the constant supply port.

10. The invention of claim 9 further comprising a return port, which is opened and closed by the second land, for receiving fluid from the brake fill port when the fedback brake fill pressure acting on the outer control surface of the first land exceeds the metered pressure acting on the outer control surface of the second land.

11. The invention of claim 9 further comprising spring means in the cylindrical bore which acts on the first land to bias the spool valve towards closing the constant supply port.

12. The invention of claim 9 further comprising a reduced orifice in the metered supply port adjacent the cylindrical bore.

* * * * *